United States Patent [19]

Handal

[11] Patent Number: 4,984,308
[45] Date of Patent: Jan. 15, 1991

[54] TOILET SEALING RING

[76] Inventor: Victor H. Handal, 12 Mill Plain Rd., Danbury, Conn. 06811

[21] Appl. No.: 380,313

[22] Filed: Jul. 17, 1989

[51] Int. Cl.⁵ .......................... F16L 9/03; E03D 11/00
[52] U.S. Cl. ...................................... 4/252 R; 285/56; 285/337
[58] Field of Search ................. 4/252 R; 285/56, 337, 285/346, 139; 277/168, 178

[56] References Cited

U.S. PATENT DOCUMENTS

| | | | |
|---|---|---|---|
| 2,075,947 | 4/1937 | Kennedy | 285/166 |
| 3,317,214 | 5/1967 | Durgom | 277/170 |
| 3,547,471 | 12/1970 | Dunmire | 285/337 |
| 3,579,670 | 5/1971 | Frank | 285/56 X |
| 3,732,582 | 5/1973 | Mielbeck et al. | 4/252 R |
| 3,940,155 | 2/1976 | Baumle | 277/183 |
| 3,952,340 | 4/1976 | Cuschera | 4/252 R |
| 4,090,267 | 5/1978 | Cuschera | 4/288 |
| 4,470,162 | 9/1984 | Marshall | 4/252 R |
| 4,502,166 | 3/1985 | Brown | 4/252 R |
| 4,874,192 | 10/1989 | Key | 285/337 |

FOREIGN PATENT DOCUMENTS

| | | | |
|---|---|---|---|
| 547790 | 10/1957 | Canada | 285/337 |
| 92592 | 11/1968 | France | 285/337 |
| 559083 | 3/1957 | Italy | 285/139 |
| 1041441 | 9/1966 | United Kingdom . | |

Primary Examiner—Ernest G. Cusick
Assistant Examiner—Robert M. Fetsuga
Attorney, Agent, or Firm—Mattern, Ware Stoltz & Fressola

[57] ABSTRACT

A toilet sealing ring provides a connection and seal for a toilet and its associated drain pipe utilizing a self-aligning annular elastomeric gasket with a cylindrical upper wall which slides inside an inner ring and a lower beveled surface which mates an outer ring inner beveled surface, and, when compressed between the inner ring and the outer ring, forms a moisture tight seal between the toilet, the toilet sealing ring, and the drain pipe.

5 Claims, 6 Drawing Sheets

TOILET SEALING RING

BACKGROUND AND SUMMARY OF INVENTION

This invention relates to toilet plumbing fixtures and, more particularly, to an improved means to provide a leak-proof seal when connecting a toilet to a drain pipe using toilet rings.

Toilet or water closet rings to secure toilets to their associated drain pipes have been in use for many years and there are many constructions known in prior art defining different means of securing and sealing toilets and their drain pipes. Prior to the use of plastic or PVC pipe in drain systems, cast iron drain pipes and toilet rings were mainly used and the accepted procedure of sealing consisted of filling the toilet ring-drain pipe joint with a compound and heating it until it reached a liquid state and formed a seal.

With the subsequent use of plastic pipe, new sealing means were utilized including the use of a neoprene or rubber gasket as a seal between the drain pipe and the toilet ring. Such sealing arrangements are shown in Cuscheva U.S. Pat. No. 4,090,267 and Cuscheva U.S. Pat. No. 3,952,340 where an annular, resilient sealing gasket, tapered at top and bottom, is compressed between the upper and lower rings, and the drain pipe. Brown U.S. Pat. No. 4,502,166 also teaches the compressing of a resilient sealing gasket where the gasket is grooved to enhance the sealing capabilities of the toilet ring. Various sealing rings and pipe joint assemblies are shown in Durgan U.S. Pat. No. 3,317,214, Kennedy U.S. Pat. No. 2,075,947, and Hawkins British Patent No. 1,041,441. A seal for a rotating shaft is disclosed in Baumle U.S. Pat. No. 3,940,155.

Problems occur when the sealing gasket is either misaligned upon installation or for some reason, the gasket bends or slips out of position thus breaking the moisture seal and allowing the waste to escape the drain system.

The present invention incorporates both an inner and an outer ring section along with an annular, resilient gasket to connect, secure, and seal the toilet to its associated drain pipe and the floor. This invention is distinguished from the prior art in that it provides an improved gasket means for a leak-proof connection between the toilet and its drain pipe in an easy-to-install configuration.

The toilet sealing ring of the present invention includes a outer ring section with an inwardly directed beveled lip at its base. The sealing gasket also has a beveled surface at its base to mate with the outer ring lip. This angular mating forces the gasket upward and inward with corresponding downward pressure from the inner ring section. The sealing gasket has a cylindrical or tapered upper wall with an outer radius such that it slides inside the inner ring section when the toilet sealing ring is assembled. Once the drain pipe is positioned in the assembled toilet sealing ring, a tightening means is used to compress the gasket between the inner ring section, the outer ring section and the drain pipe forming a moisture tight seal between the said toilet seal and said pipe. This seal is created with low risk of misalignment or gasket slippage upon installation.

This combination of useful features for the securing and sealing of a toilet to its associated drain pipe is not believed to be disclosed or suggested by any of the prior art patents and, in view of the above, it is an object of the present invention to provide a toilet ring assembly which, when used with its sealing gasket, will secure and seal a toilet to its drain pipe with little or no risk of misalignment or gasket slippage.

Another object of the present invention is to provide a highly reliable sealing means including a first ring portion having a beveled lip supporting a sealing gasket having a mating beveled surface, which when compressed by a second ring portion configured to slide inside said first portion will form a seal with an inserted drain pipe structure.

Another object of the present invention is to provide a two-piece toilet sealing ring with a sealing gasket which self-aligns with the upper and lower ring sections and, when compressed, forms a moisture-proof seal.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

THE DRAWINGS

DESCRIPTION AND PREFERRED EMBODIMENT

Figure 1:
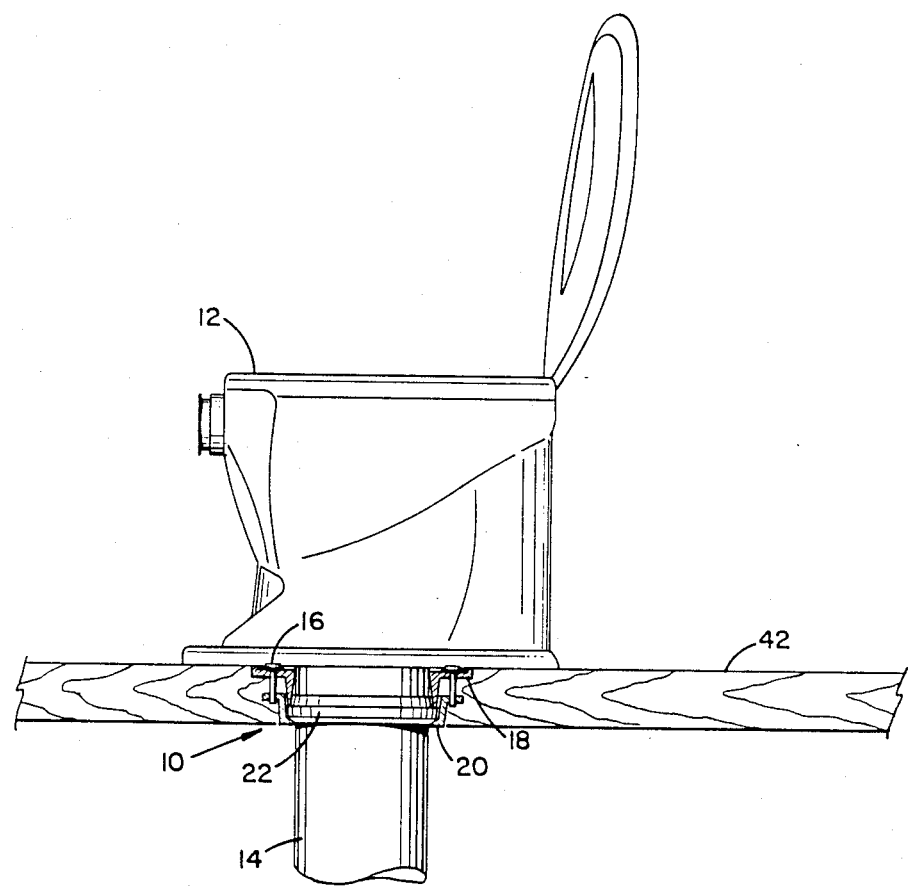
FIG. 1 is a fragmentary perspective side elevation view of the improved toilet sealing ring of the present invention in an operative configuration.

With reference to the accompanying figures, FIG. 1 in particular, the toilet sealing ring 10 of the present invention, which is used to secure a toilet 12 to its associated drain pipe 14 with clamping bolts 16, is composed generally of an inner ring section 18, an outer ring section 20, and a resilient, flexible gasket 22.

Figure 2:
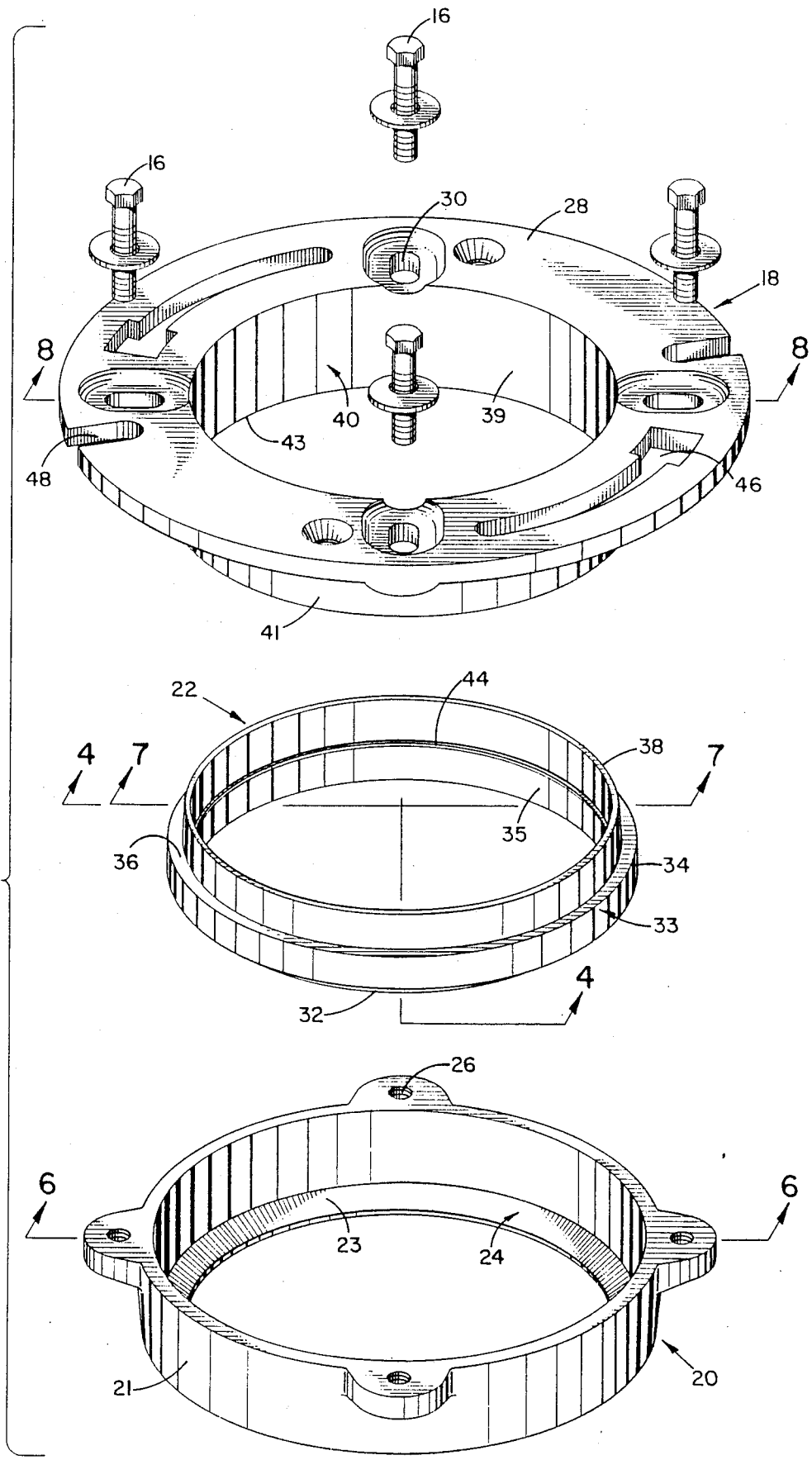
FIG. 2 is an exploded perspective view of the same toilet sealing ring.
Figure 6:
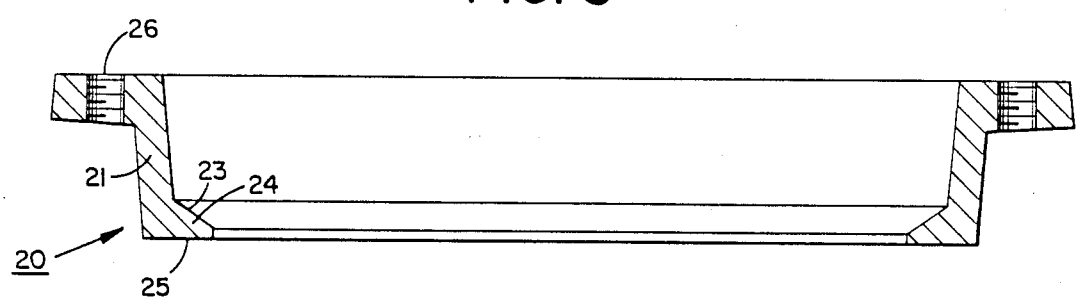
FIG. 6 is a side elevation view of the outer ring section of the same toilet ring assembly, shown in cross-section taken along plane 6—6 shown in FIG. 2.

As can be seen clearly in FIG. 6, the outer ring section 20 is basically comprised of a mid-wall 21, a lip 24, and four bolt eyes 26, two of which are shown in FIG. 6. The mid-wall 21 extends the height of the outer ring 20, connecting to the bolt eyes 26 at its crown and to the lip 24 at its base. The outer ring lip 24 extends radially inward and encircles the base of the outer ring section 20. The outer ring lip 24 inclines slightly at its upper face 23 to allow the gasket 22 to set while its lower face 25 has no incline. Projecting radially outward from the crown of the outer ring mid-wall 21 are four threaded bolt eyes 26 as can be seen in FIG. 2. The bolt eyes 26, which are spaced uniformly about the crown of the mid-wall 21, are threaded to retain clamping bolts 16.

Figure 8:
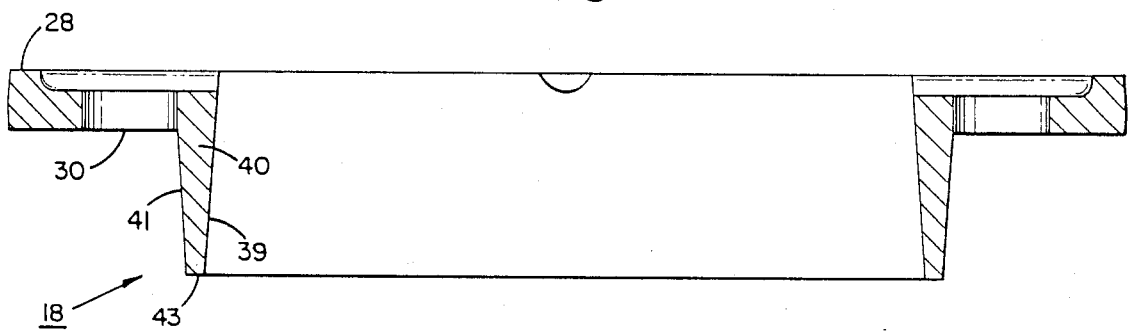
FIG. 8 is a side elevation view of the inner ring section of the same toilet ring assembly, shown in cross-section taken along plane 8—8 shown in FIG. 2.

The inner ring section 18 incorporates an annular ring wall 40, a ring flange 28, four bolt eyes 30, two toilet mounting holes 46, and two toilet mounting slots 48. These inner ring elements can plainly be seen in FIG. 2. The ring wall 40, which juxtaposes the ring flange 28 at its vertex, is composed of an inner wall 39, an outer wall 41, and a base 43, as can be seen in FIG. 8. The inner wall 39 tapers radially outward beginning at the top of the ring wall 40 and terminating at base 43, and the outer wall 41 tapers inward at a corresponding angle. The ring flange 28, which is outwardly disposed at the top of the ring wall 40, provides the bolt eyes 30, the mounting holes 46, and the mounting slots 48. As shown in FIG. 2, the four upper bolt eyes 30 are bored in the flange 28 to align with the threaded bolt eyes 26 of the outer ring section 20, while the two mounting holes 46 and the two mounting slots 48 are each configured such that each hole and slot is radially opposite its mate.

Figure 3:
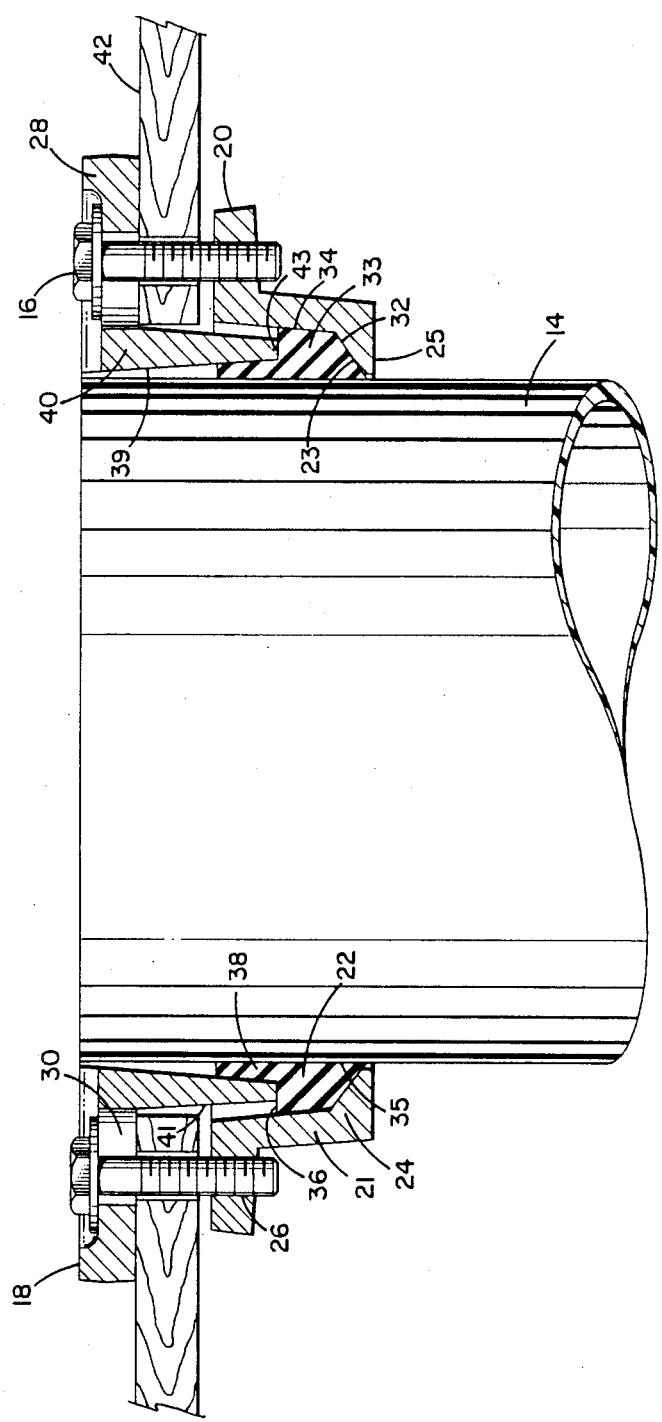
FIG. 3 is a cross-sectional view of the same toilet sealing ring after assembly around a drain pipe.
Figure 4:
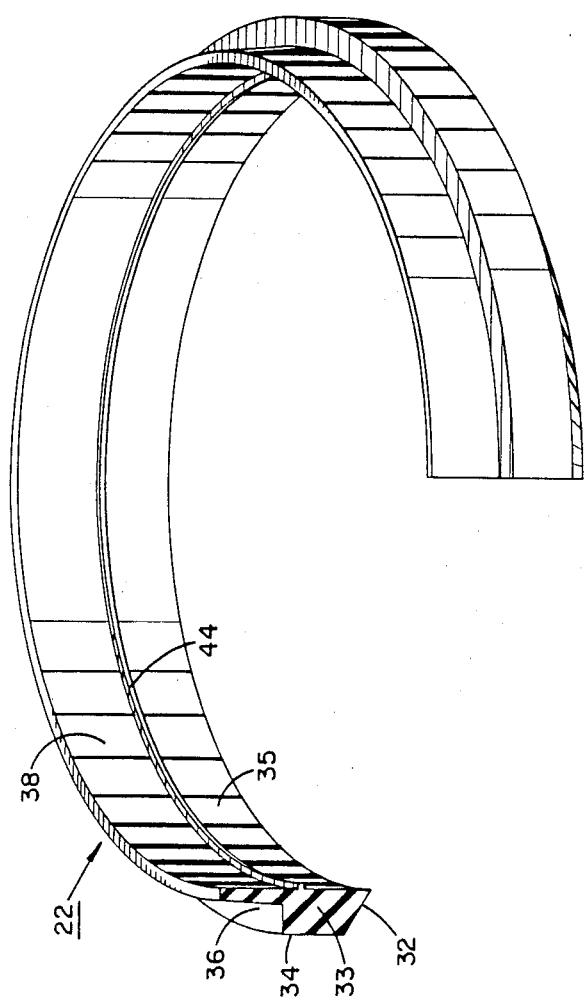
FIG. 4 is a perspective view of the improved gasket means used and associated with the toilet sealing ring shown in partial cross-section taken along line 4—4 shown in FIG. 2.
Figure 7:
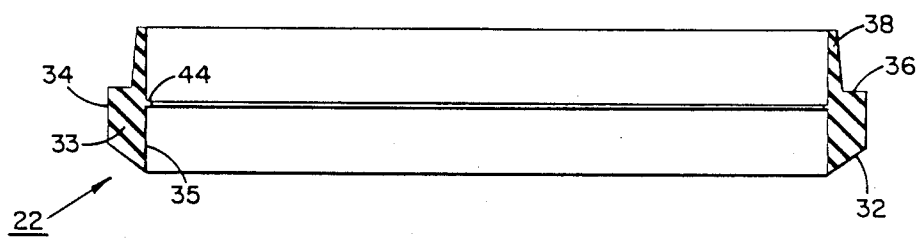
FIG. 7 is a side elevation view of the gasket means of the same toilet ring assembly, shown in cross-section taken along plane 7—7 shown in FIG. 2.

As can be seen in FIG. 2, the sealing gasket 22, which is composed preferably of rubber, or of a similar elastomeric material if desired, is sandwiched between the inner and outer ring sections 18 and 20. As shown in FIG. 4 and FIG. 7, the annular gasket 22 includes a central straight walled section 33, with a lower outer wall 34 and an inner wall 35 having a small inwardly protruding sealing rib 44. At the base of central section 33, a downwardly and inwardly slanted beveled surface 32 adjoins the inner wall 35 and the outer wall 34. A shoulder 36 extends radially inward from the upper end of the vertical lower outer wall 34, and adjoins the thin, upstanding upper wall 38. As shown in FIG. 3, the outside diameter of the gasket's upper wall 38 is such that it slides easily inside the inner ring wall 40 of inner ring 18, while allowing the ring base 43 of inner ring 18 to seat on the gasket shoulder 36. This also can be seen in FIG. 5.

To assemble, the two piece toilet sealing ring 10 is configured as described above and is slipped over the drain pipe 14 until the bottom surface of the upper ring flange 28 rests upon the surface of floor 42. Clamping bolts 16 are then tightened, thereby compressing the gasket 22 between the inner and outer ring sections 18 and 20. As can be seen in FIG. 3, the inner ring base 43 forces the gasket shoulder 36 downward and drives the gasket beveled surface 32 against the matching incline of the outer ring lip upper face 23. This action compresses not only the gasket lower inner wall 35 against the drain pipe 14 and the gasket lower outer wall 34 against the outer ring mid-wall 21, but also compresses the upper gasket wall 38 between the drain pipe 14 and the inner ring inner wall 39. Because the upper gasket wall 38 is wedged between the drain pipe 14 and the inner ring wall 40 as the gasket 22 is compressed between the outer ring 20 and the drain pipe 14, there is virtually no chance that the gasket 22 can bend or slip from between the two ring sections 18 and 20, which would in turn, break the moisture seal.

Figure 5:
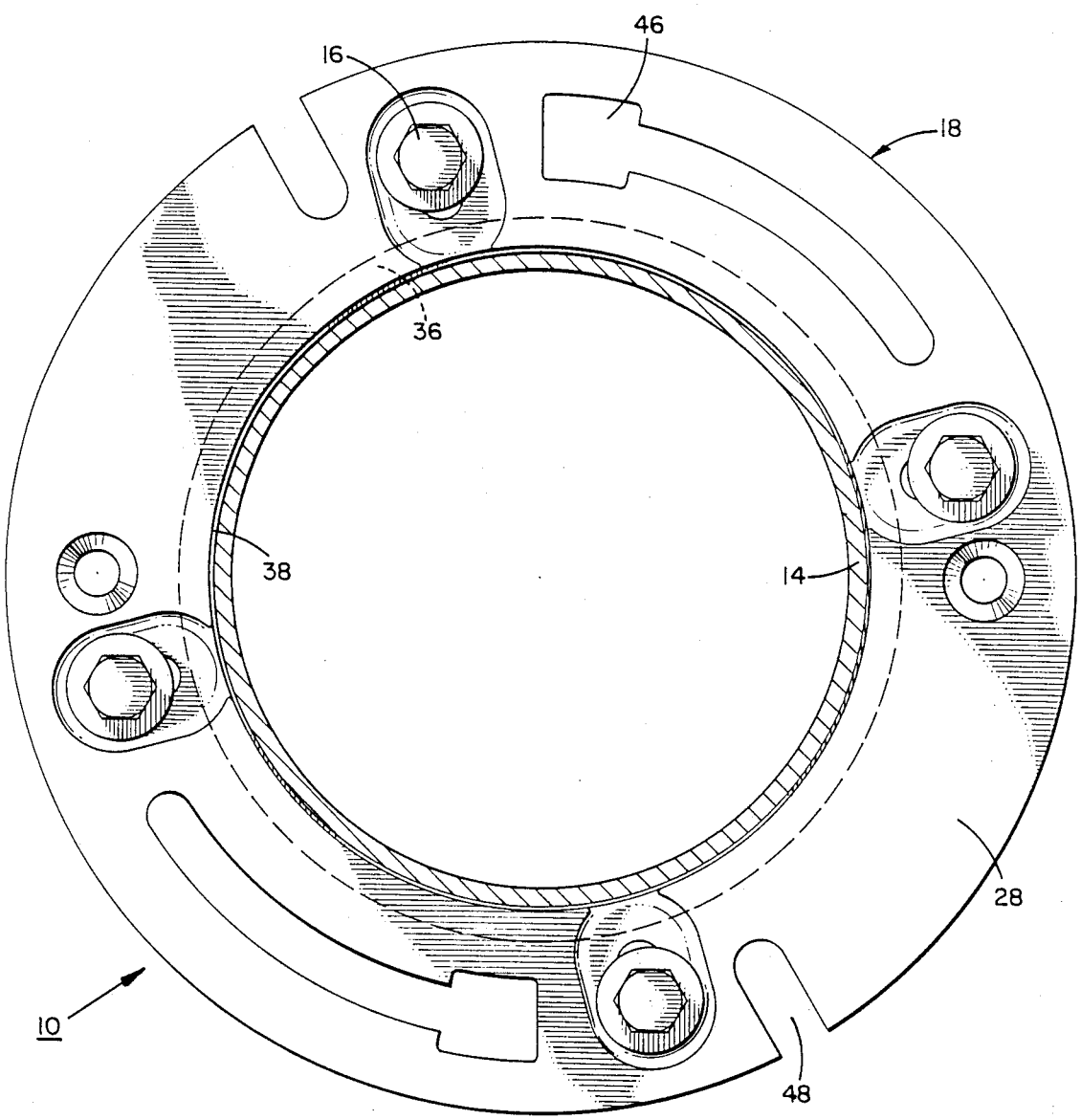
FIG. 5 is a top plan view of the same toilet sealing ring after assembly.

Secondly, because the inner ring portion 18 fits like a sleeve around the upper gasket wall 38, there is little risk of a misalignment of the assembled ring-gasket-ring joint. FIG. 5 shows a top plan view of the gasket-ring configuration. The gasket sealing rib 44, as it is compressed against the drain pipe 14, will conform with any pipe irregularities and thus form a moisture impervious seal between the inner and outer ring sections 18 and 20 and the drain pipe 14. The toilet 12 is then placed over the toilet sealing ring assembly 10 and is secured with bolts engaging toilet mounting holes 46 or toilet mounting slots 48 of inner ring 18, as shown in FIG. 2. The installation is then complete.

The present invention, as described above, can be utilized as an easily installable connection device between a toilet and a drain pipe. Because of its self-aligning gasket configuration, the toilet sealing ring forms an impenetrable moisture seal between the drain pipe and the ring sections without the risk of a gasket-ring misalignment upon installation. This allows an easier and more reliable installation process while at the same time guaranteeing a leak-proof seal.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved toilet sealing ring for sealing installation encircling the upper end of a drain pipe means comprising in combination:
   a. a first outer section which is ring-shaped and slightly tapered and incorporates an inwardly beveled lip;
   b. a second inner section which is ring-shaped having an outer surface which is slightly tapered such that at least a portion of the second section will fit overlappingly within the first section and an inner surface which is slightly tapered toward the outer surface, exposing an annular end surface thereof facing said inwardly beveled lip;
   c. clamping means operatively connected to cause increased overlapping juxtaposition of said sections;
   d. annular gasket means formed from resilient rubber-like material interposed between said sections and said drain pipe means incorporating a beveled outer surface positioned for being mated with the first section's beveled lip about the internal circumference of the first section;
   e. means forming an annular shoulder encircling the gasket means and juxtaposed to the second section's annular end surface;
   f. annular inner upper wall means on the gasket means extending axially from the shoulder and having an outer diameter such that it fits telescopically within said second section and an outer surface which is slightly tapered to cooperate with the inner surface of the second inner section, and an inner diameter such that it encircles the drain pipe means in close juxtaposition; and
   g. said gasket means having a central portion, with substantially parallel inner and outer walls, having an inner diameter and an outer diameter respectively such that increased axial overlap of said sections produced by said clamping means compresses said resilient gasket means between said beveled lip and said annular end section, urging said outer wall surface into compressive engagement with said first section means, and urging said inner wall surface into compressive engagement with said pipe means.

2. The toilet sealing ring defined in claim 1 wherein said gasket means incorporates an inwardly projecting rib impinging against said discharge pipe means.

3. The toilet sealing ring defined in claim 1 wherein said clamping means to provide telescopic pressure between said first and second sections is a plurality of bolts.

4. The toilet sealing ring defined in claim 1 further including a flange extending radially outward from upper end of said second section, said flange including means for securing said toilet ring to a floor and to a toilet.

5. The toilet sealing ring defined in claim 3 wherein said second section includes unthreaded bolt holes wherein said bolts are positioned and said first section incorporates matching threaded bolt eyes into which said bolts are tightened.

* * * * *